United States Patent [19]

Cornell

[11] Patent Number: 5,259,338

[45] Date of Patent: Nov. 9, 1993

[54] SAFETY HARNESS FOR CHILDREN

[76] Inventor: Karen L. Cornell, 17 Valley St., Salem, Mass. 01970

[21] Appl. No.: 799,973

[22] Filed: Nov. 29, 1991

[51] Int. Cl.$^5$ .............................................. A01K 29/00
[52] U.S. Cl. ................................... 119/770; 297/484; 128/875; 119/907
[58] Field of Search .................. 119/96, 106, 109; 272/97; 297/467, 468, 469, 484, 485; 128/875

[56] References Cited

U.S. PATENT DOCUMENTS

| | | | |
|---|---|---|---|
| 1,651,561 | 12/1927 | Storey | 128/875 |
| 2,623,678 | 12/1952 | Law | 119/96 |
| 3,604,750 | 9/1971 | Doering | 297/485 |
| 3,612,605 | 10/1971 | Posey | 297/484 |
| 4,308,629 | 1/1982 | Freemon | 119/96 |
| 4,666,017 | 5/1987 | Zimmerman | 119/96 |
| 4,667,624 | 5/1987 | Smith | 119/96 |
| 4,729,345 | 3/1988 | Anderson | 119/96 |
| 4,745,883 | 5/1988 | Baggetta | 119/96 |
| 5,069,168 | 12/1991 | Roberson | 119/96 |

Primary Examiner—John G. Weiss

[57] ABSTRACT

A one piece safety harness for children is disclosed which connects a child to the parent with an inelastic strap which is worn around the waist of the adult as a belt and which is continuously affixed to a harness worn around the torso of the child. The harness is made of an elasticized belting material comprised of a waistband with two shoulder straps which cross at the back and which are permanently sewn to the waistband. The connecting strap is made of an inelastic woven material and is permanently sewn to the side of the waistband of the harness and which is then worn laced around the waist of the parent and then drawn through a two ring metal closure.

1 Claim, 3 Drawing Sheets

SAFETY HARNESS FOR CHILDREN

BACKGROUND OF THE INVENTION

The invention relates to a safety harness for children, particularly one which connects the child to the parent by means of a harness worn on the child's torso and continuously affixed to a connecting strap which is worn around the parent's waist as a belt.

This invention is used for babies, toddlers and young children as a solution to the constant problem of keeping a yound child closely supervised by an adult in many situations in which being separated from the adult poses a serious and dangerous threat to the child's safety such as in shopping malls, large outdoor areas, crowds and busy streets.

Getting lost or separated is every child's dread and every parent's overwhelming fear especially in a crowd or near traffic yet each conventional approach is inadequate in ensuring the safety of the child. Holding hands with or carrying the child are insufficient in many ways; it is both strenuous and often impossible to maintain holding hands in that it goes against the child's natural tendency for independent walking, is uncomfortable for both adult and child due to the disparity in height between adult and child, and is impossible to maintain with a squirming child. Constantly trying to maintain contact ruins fun of the activity and, in a shopping situation, is impractical since it prevents the use of one hand for both adult and child and a breach of safety occurs often whenever the hands are let go.

Carrying the child is too cumbersome for the parent and too uncomfortable for the child to be maintained for any length of time and inherits the same disadvantages of holding hands.

Previously designed harnesses usually have a short leash-like strap attached to it which can be held by the parent for walking or fastened to the carriage to keep the child in. Having to hold the strap prevents the free use of one or two of the parent's hands and prevents any real mobility for the child since the straps are extremely short. The parent must walk bent over to adjust to the height of the child. Conventional harnesses of this type are also adamantly unfavorably viewed by the general public as too similar to animal leashes, therefore too undignified, embarassing and demeaning to use for children.

None of the conventional methods of holding hands, carrying the child, holding a short strap attached to a harness, or pushing a carriage, afford any real security in that the parent must always use one or two hands to maintain supervision or contact with the child and that security is repeatedly breached when the parent lets go in order to use two hands. Due to the combination of the child's physical limitations and the child's natural tendency to wander, no small child can be trusted to stay close to a parent of his own volition. Yet staying close is paramount to safety. We are all too familiar with the sidewalk scene of parent admonishing the child to stay close or hold hands while the battle weary child sprawls on the ground exhausted and frustrated.

I have developed a safety harness which affords comfort, dignity and impenetrable security for the child and parent in its continuous design, lack of apparent hardware and simplicity of design.

In researching the design of my invention I found U.S. Pat. No. 4,667,624 to be similar in that the child wears a conventional looking harness about his torso which criss-crosses in the back and which can be attached to a connecting strap which can be attached to a multiple of rings on a belt worn around the waist of the adult. This design, however, does not adequately address the problem of security in that the child, or any other person, can very easily disengage the connecting strap from the child or adult without immediate apparence to the parent immediately breaching the security. It consists of a multitude of metal hardware for sizing and attachments which is not only unattractive and institutional looking, contributing to the indignity of an animal harness, but which offers several places for unwanted breaches of security. The child could also be unintentionally injured by the multitude of hardware.

SUMMARY OF THE INVENTION

My safety harness consists of a harness made of elasticised belting material which is slipped over the head of the child and fitted over the torso. The child's portion of the harness is sewn together to a connecting strap of an inelastic woven belting material which is then circled about the waist of the parent and closed in a double ring closure. The child's harness compensates for size adjustment by nature of its elasticized material eliminating the need for any unattractive or unconfortable hardware. The belt portion of the harness which is worn around the parent's waist incorporates size adjustment without the use of unessesary hardware by virtue of its length and the spacing of the double ring closure.

The placement of the connecting strap on the side of the child's harness, as opposed to in the back as in U.S. Pat. No. 4,667,624, affords comfortable wearing and a more natural placement for walking side by side. This side placement also affords the wearing of the harness under the coats of the child and parent with the connecting strap laced through their respective sleeves and only the connecting strap showing between the parent and child.

This improved safety harness for children meets the objectives of complete security and maintenance of social dignity; the child cannot disengage from the parent except by completely removing the whole harness by taking it off over the head. This movement is extremely difficult for any young child to manage, and the parent would be immediately alerted by feeling this movement in time to supervise the child. No intruder could serrupticiously disengage the child from the adult without the parent's awareness. The simple design allows the child and the parent freedom of independent walking with the security of close attachment at all times. The ample area between parent and child allows them a space for comfortable walking together and allows the child to be put into a carriage and remain attached to the parent. Both parent and child have the use of both hands at all times. There is nothing about the design which constricts movement of any kind on the part of parent or child and there is nothing demeaning or undignified about the looks of the design. The harness will be offered in a variety of colors and printed designs enhancing the social acceptance of the use of the harness.

Widespread use of this devise would finally offer a solution for every parent to the dreaded fear of losing a child in a crowd, or having the child wander off in a dangerous situation. It also offers a solution to the false security of having a child in a carriage since any intruder could walk off with a carriage. A child could wear the harness and still be placed in the carriage and be positively securely linked with its mother.

DETAILED DESCRIPTION WITH REFERENCE TO DRAWINGS

Figure 1:
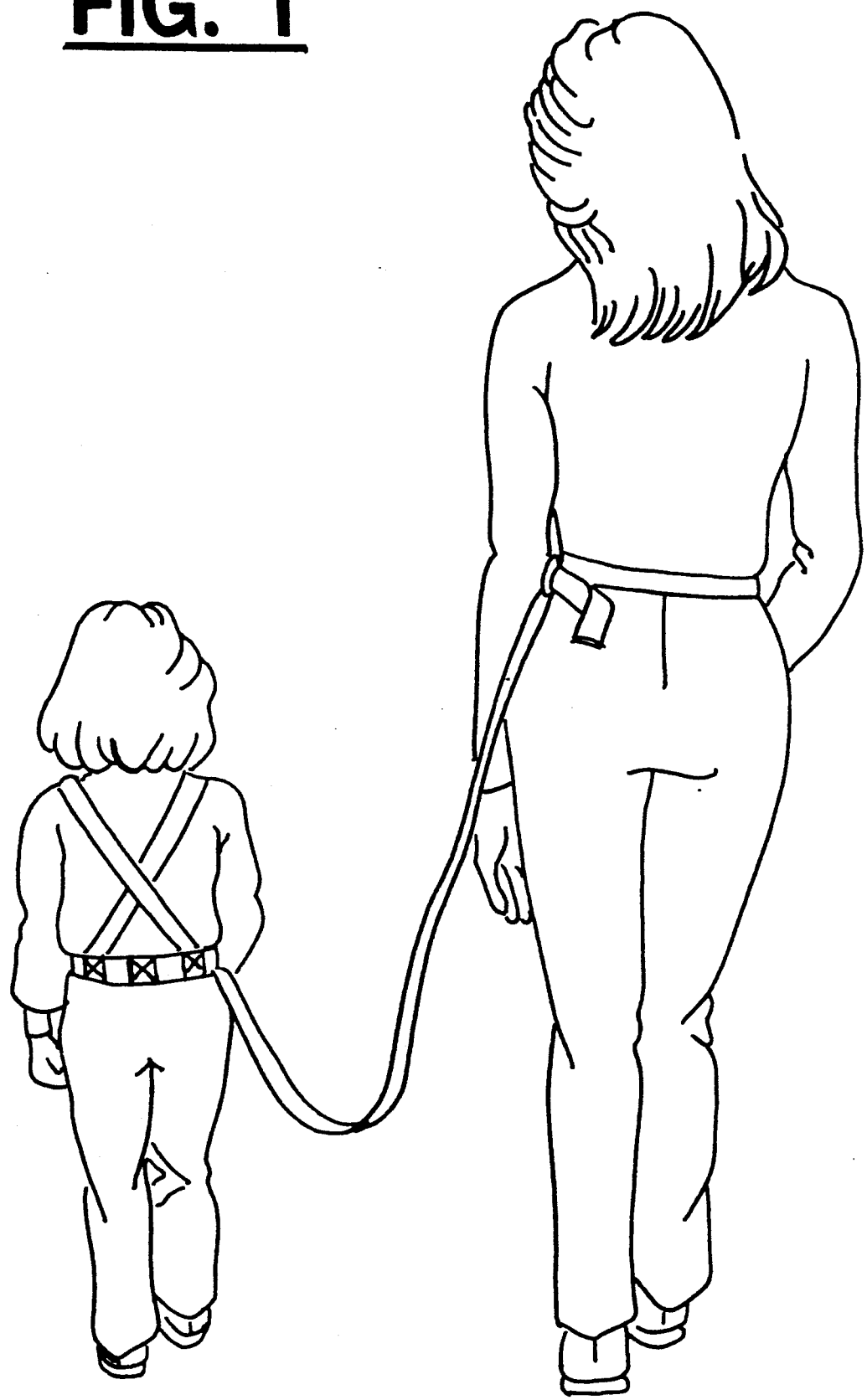
FIG. 1 is rear view of the harness in use on a child and an adult.
Figure 2:
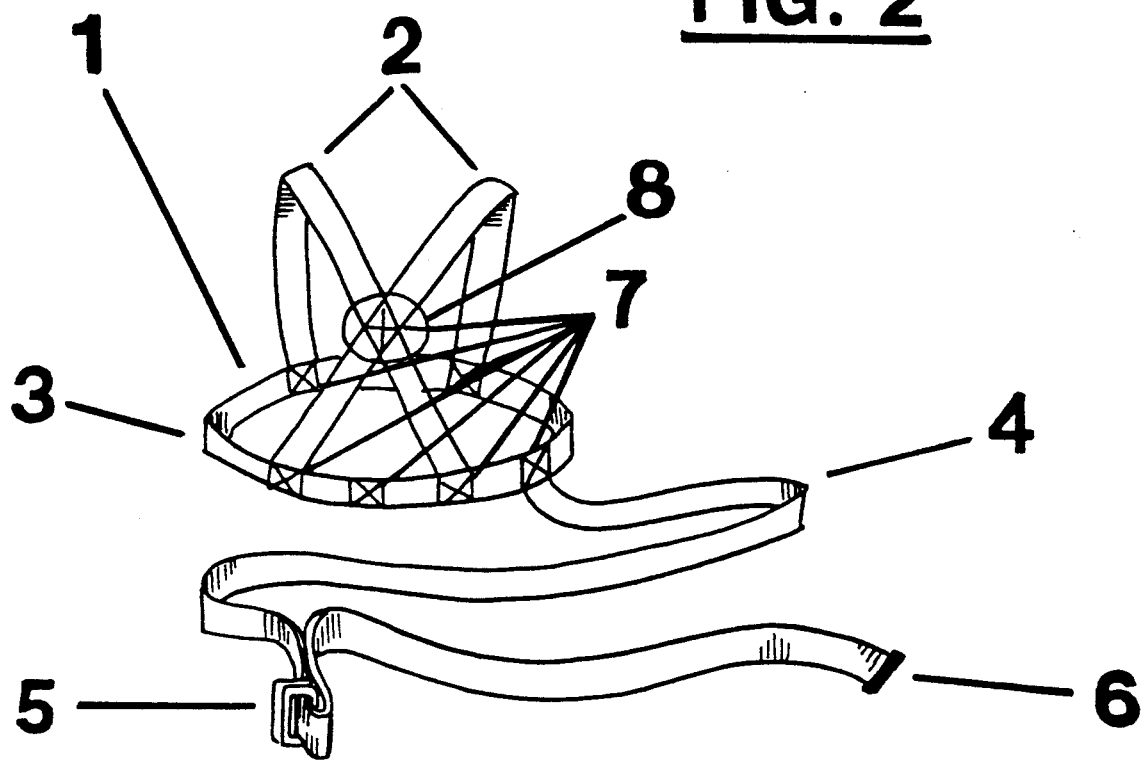
FIG. 2 shows a rendering of the safety harness.
Figure 3:
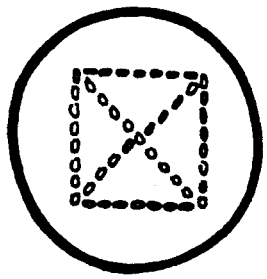
FIG. 3 is a sewing stitch style used to connect a pair of straps on the harness.
Figure 5:
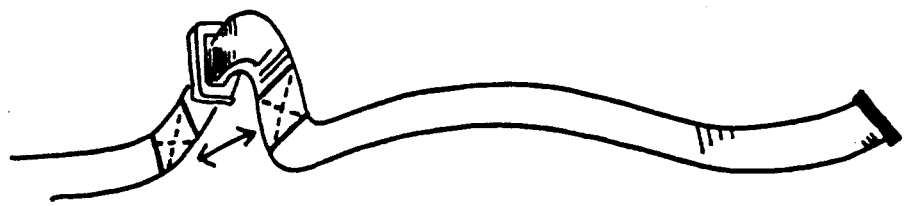
FIG. 5 is a connecting strap with fastening rings.
Figure 4:
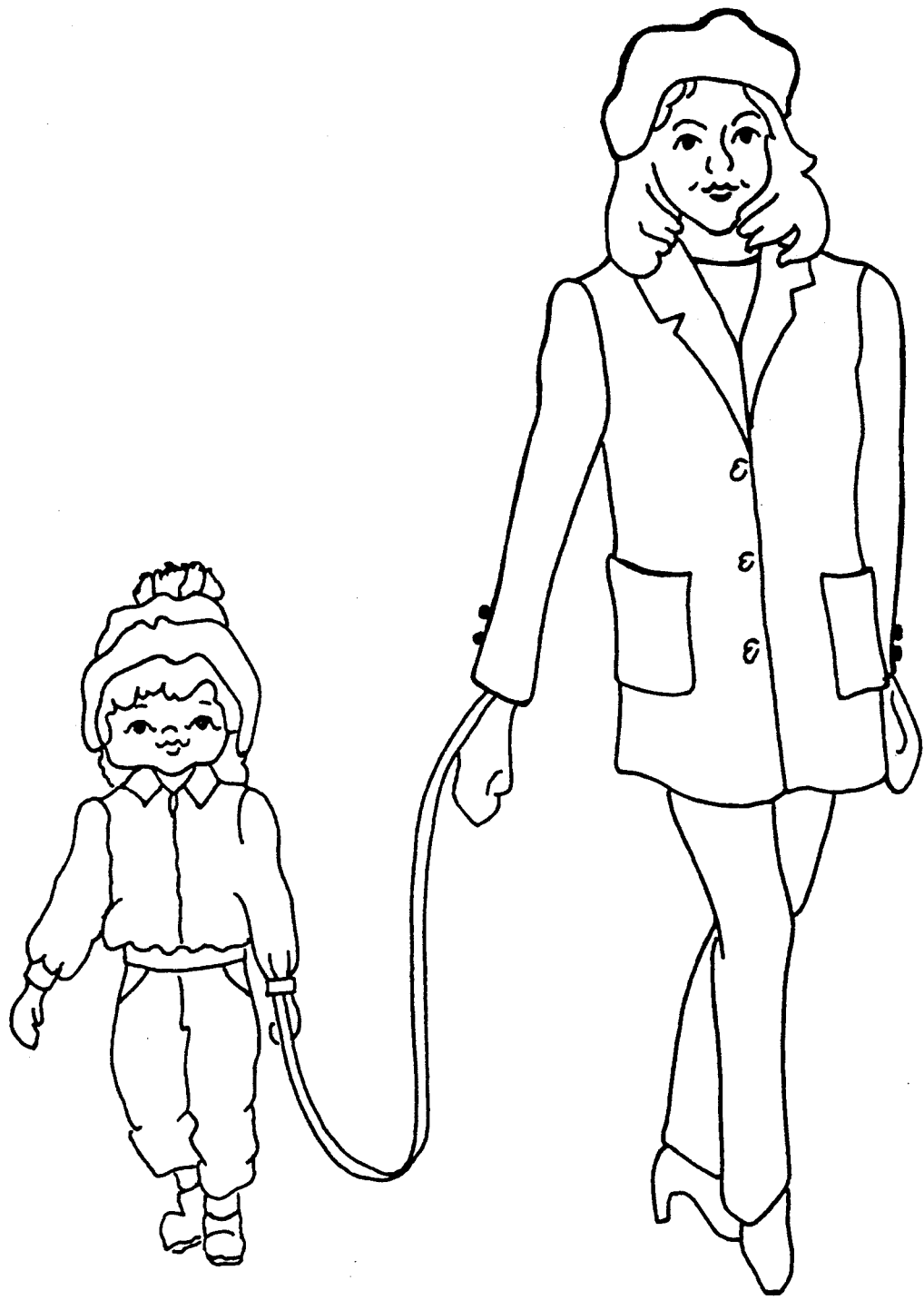
FIG. 4 is a front view of the harness in use by a child and an adult.

FIG. 2 shows a rendering of the safety harness which includes a harness 1 which is worn about the torso of the child and is properly fitted with the two shoulder straps 2 sewn in a fixed criss-cross in the back 8. Each place of connection 7 of the harness 1 to the waistband 3 is sewn as shown in FIG. 3, a detailed close up of the stitching of the points of attachments. The connecting strap 4 is connected to the harness at the side of the waistband by the same stitch style as shown in FIG. 3. The connecting strap 4 is then placed directly around the waist of the parent as shown in FIG. 1 and securely fastened through the two rings 5, as in a conventional woven belt, making a waistband on the parent. The end of the connecting strap is secured with a metal piece 6 to prevent fraying of the material. The connecting strap can be drawn through the sleeve of the child's coat or sweater, thence through the sleeve of the parent's outer garment and then drawn through the belt loops of the parent's trouser to be worn under the outer clothing making only the connecting strap visible to the public as shown in FIG. 4. The connecting strap/waistband adjusts to the size of the parent by the doubling of the material and sewing the lengths together with the rings "floating in between as shown in FIG. 5. There is no criss-cross in the shoulder straps in the front of the child's harness.

As is readily apparent from the description and the drawings, this harness is a very simple one-piece design which grants comfort and genuine security as offered by no prior art. The harness offers no breaks in continuity, thus no opportunity for accidental disengagement from the adult. Because the design has only the double ring closure on the adult portion as hardware, there is no chance of the child being scraped or otherwise hurt by the hardware, or of the child, or any interfering other person, unfastening the child from the parent. The lack of unnecessary hardware also makes the harness less costly to make and the elasticized material eliminates the need for excess which would have been needed for size adjustments. This lack of hardware also offers a more attractive, more comfortable look and feel for the child and parent, thus eliminating the association of this garment from a leash or other harness used for animals. The material is soft and comes in a variety of colors and designs making the harness much more attractive to the general public.

I claim as my invention:

1. A one-piece child safety harness to be worn about the torso of a baby, toddler or child for the purpose of keeping close and secure proximity between a child and an adult without constricting the natural movements of either, the safety harness comprising;

a one-piece waistband made of soft elasticized material, self-adjusting in size by nature of the elasticized material having a back side and a front side permanently sewn together in the back side, a pair of shoulder straps each made of soft elasticized material each of which are permanently and fixedly sewn at points to the front side of the waistband and each adapted to continuously extend over the shoulders, criss-cross in the back of the child and then are permanently and fixedly sewn to the back side of the waistband at points opposite and respective to the front side attachment points, and each shoulder strap, by nature of the elasticized material, self adjusting in size, a connecting strap made of flexible inelastic material permanently and fixedly sewn at one end to the waistband and continuously extending a sufficient and fixed length to a free end to afford a comfortable walking distance between the wearers and at the free end of the connecting to be circled about the waist of an attending adult person and; a two ring metal closure attached to an intermediate point on the connecting strap through which the free end of the connecting strap is inserted to provide a closure of the free end around the waist of the attending adult as an adjustable belt.

* * * * *